United States Patent Office 2,908,989
Patented Oct. 20, 1959

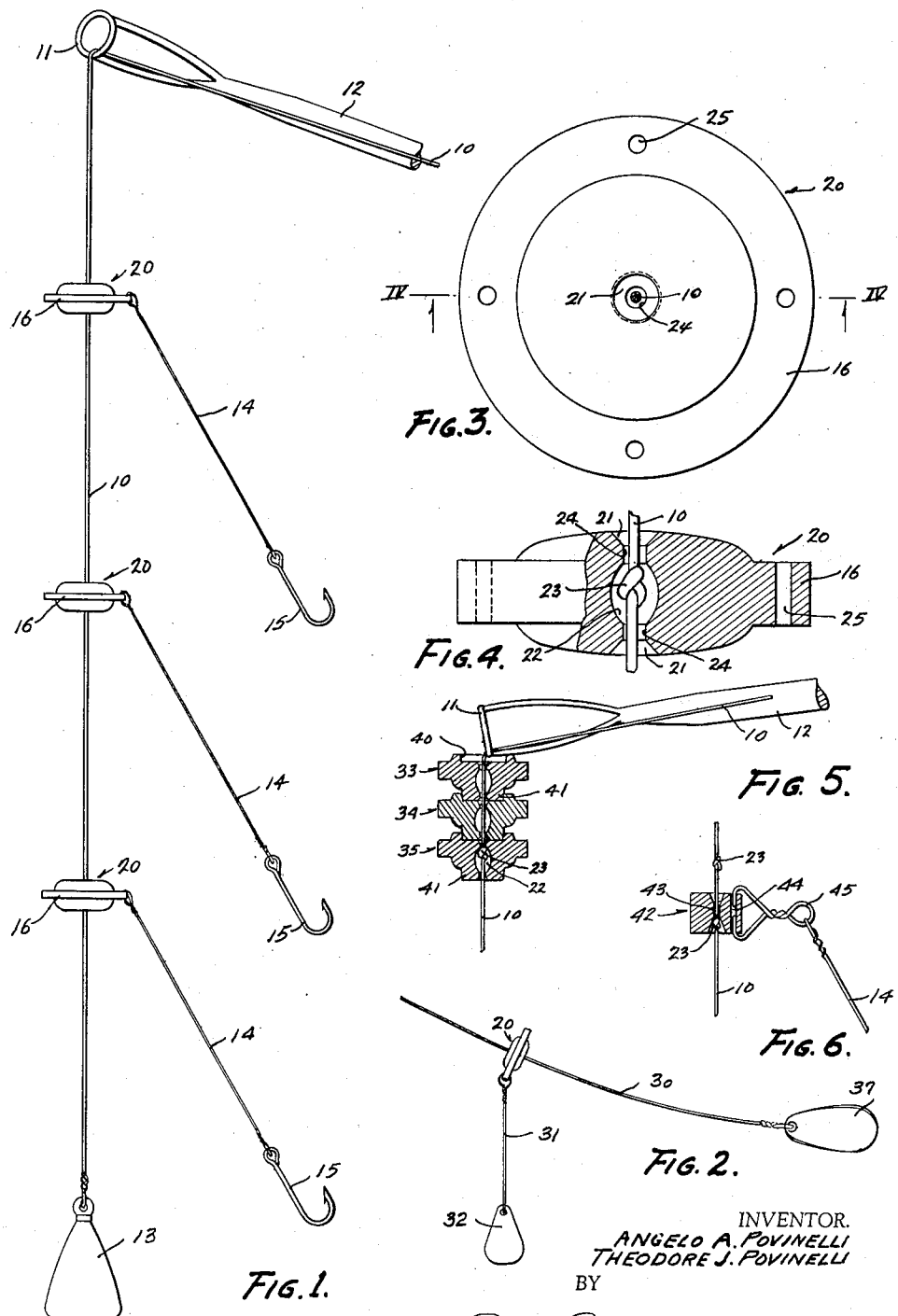

2,908,989

FISHING AID

Angelo A. Povinelli and Theodore J. Povinelli, Buffalo, N.Y.

Application April 14, 1958, Serial No. 728,396

5 Claims. (Cl. 43—42.74)

Our invention relates in general to fishing devices, and in particular to a multi-line fishing gear.

It is well known to those skilled in the art that when a number of leaders are fixedly attached to one fish line, difficulty is experienced when the fisherman reels in his line after a strike, particularly when the strike is on one of the lower hooks, and chances are that the fish may be lost in an attempt to land it owing to the presence of the other widely spaced leaders.

The principal object of our invention is to provide a device, whereby when the leaders are once set at the selective spaced places on the line, the full length of the line may be reeled in at will.

Another object is to provide a device which permits the fisherman to readily and conveniently place a leader at any desired position on the line by simply tying a knot therein for each leader.

A further object is to provide a plurality of disks each releasably fixed upon the line but movable upon reeling in of the line.

Moreover, our device permits free rotative movement of the leaders when upon the line.

The above objects and advantages have been accomplished by the device shown in the accompanying drawings of which:

Fig. 1 is an elevational view showing one arrangement of our device;

Fig. 2 is a fragmentary view showing another arrangement thereof;

Fig. 3 is an enlarged plan view of one of the leader disks of our invention;

Fig. 4 is a fragmentary sectional view of the disks showing Fig. 3 and taken on line IV—IV thereof;

Fig. 5 shows a sectional elevational view of a number of disks of modified form in nested positions; and, Fig. 6 is a sectional view of a modified form of disk.

Referring to the drawings and in particular to Figs. 1 to 4 inclusive, 10 represents a fish line supported by a conventional fish pole 12 having a ring or line guide 11. A sinker 13 is attached to the bottom of the line to keep it taut when used in still fishing. As shown in Fig. 1 a number of leaders 14 and fish hooks 15 are carried by the depending portions of the fish line 10. Each of the leaders 14 is attached to the rim 16 of a leader disk 20 carried by the fish line.

As shown in Figs. 3 and 4 each of the leader disks is of unitary form and is provided in each of its faces with a face aperture 21, which are joined together by an enlarged central aperture 22. Wherever a leader disk is to be releasably fixed in selected position upon the fish line a knot 23 is tied in the fish line. The face apertures 21 are so proportioned in relation to the diameter of the fish line that movement of the knot 23 tied therein is restrained in either direction and may be pulled through either of the face apertures when the line is placed under tension. The relative fit of the knot in the face apertures, however, is such that the knot will pass through the face apertures upon reeling in of the line. So as to facilitate entrance of the knot into the face apertures the outer ends 24 of each of the face apertures is preferably formed with a tapered counterbore which act as means for centering the knots as clearly shown in Fig. 4. Since it is desirable that the disks rotate freely upon the fish line so as to permit the leader and the hook it carries to swing about the line, the central aperture 22 is of increased size so that it will not restrict the free movement of the disk. The rim 16 of the disk is preferably formed with a number of leader apertures 25 for attachment to the disk of one or more leaders or sinkers.

In Fig. 2 we have shown our invention as applied to trolling. When thus used, the fish line 30 carries the lure 37 at the outer end thereof, and at some distance along the line a knot is tied for releasably fixing the sinker line 31, to the lower end of which a sinker 32 is attached. This form of the invention permits the fisherman to regulate the distance between the lure and the disks 20 by moving it to a different knot in the line.

In Fig. 5 we show a number of disks 33, 34 and 35 in the nested positions which they will occupy when the fish line 10 is reeled in. The knots which have engaged the disks 33 and 34 have been reeled in successively as the disks engaging them have been brought into contact with the ring 11 of the fish pole and with the next succeeding disk. As shown, the knot 23 of the disk 35 is still in engagement with the last disc 35, but it is obvious that this knot may also be drawn up through the disks 33 and 34 if it is desired to further reel in the line. These disks are different in form than those of Figs. 1 to 4, and this figure serves to illustrate the manner in which the disks of this type are nested when reeling in the line. The disks 33, 34 and 35 are each preferably provided with a recess 40 in the upper face thereof, which as shown in Fig. 5, is engaged by a reduced diametrical portion 41 formed on the bottom surface of the next upper disc. This construction serves to aline the apertures of adjacent disks.

The form of invention shown in Fig. 6 illustrates a disk 42 in the form of a cylinder having an aperture 43 formed therethrough of a size substantially the same as the size of the face apertures 24 of the disks 20. In this form of invention no enlarged central aperture is provided, but two spaced-apart knots 23 are formed in the line at a distance preferably greater than the length of the cylinder. At one side of the cylinder there is formed an aperture 44 in which a leader wire clip 45 is engageable.

As hereinbefore stated, the relative proportion of the face apertures 21 and of the aperture 43 are such that the knots formed in the line may be pulled therethrough upon the application of tension on the line as in reeling it in. The disks are preferably made of flexible material such as plastic of which polyethylene is an example. The yieldability of this material readily allows the knots to pass through the apertures when the line is pulled therethrough as when reeling it in. The resistance of such passage, however, being sufficient to maintain the disks and the leaders carried by them in the desired position while fishing. While the disks are preferably made of flexible material, they may be made of material which does not readily yield to permit the passage of the knot. In such cases, however, the clearance between the knot and the aperture is made less than that of the flexible disks and the resiliency required for the passage of the knot through the aperture is accomplished by the resiliency in the knot itself.

From the foregoing, it will be obvious that when a strike is had on any of the hooks, the fisherman will reel in the line and if the strike is on the hook of the leader of the first disc, the line will not be reeled in sufficiently to pull the first knot through the disc. If, however, the strike is on the hook of the leader of the second disc, then the knot of the first disc will be pulled through the first disc and the second disc will be drawn up in nested position with relation to the first disc. The disks are, therefore, drawn up successively in nested arrangement until the one having the strike is in position, whereby no one of the disks or leaders will interfere with the fisherman in his landing of a fish caught on any one of the leader hooks.

What is claimed is:

1. A fishing device, comprising a fish line, a series of knots formed in said line in spaced relative relation, a series of resilient unitary disks mounted upon said line and releasably engageable with the knots therein, each disk being of unitary form and having a longitudinal aperture in each of its end faces, each of the apertures being so proportioned as to resist the free passage of said knots in either direction through said apertures except when tension is placed upon the line, and each of said disks being formed intermediately of its end faces with an enlarged central aperture coaxial with the face apertures for the free unrestricted disposition therein of one of said knots.

2. A fishing device, comprising a fish line, a series of knots formed in said line in spaced relative relation, a series of resilient unitary disks mounted upon said line and releasably engageable with the knots therein, each disk being of unitary form and having a longitudinal aperture in each of its end faces, each of the apertures being so proportioned as to resist the free passage of said knots in either direction through said apertures except when tension is placed upon the line, each of said disks being formed intermediately of its end faces with an enlarged central aperture coaxial with the face apertures for the free unrestricted disposition therein of one of said knots, and the outer end of each of said face apertures being formed with a tapered counterbore, whereby to permit the ready registration of a knot with said face aperture.

3. The combination of a fishing line and a leader disk for use with a reel, and a fishing pole having a line guide, said line having a number of spaced knots permanently tied therein, of a unitary relatively flat leader disk for attachment of a fish hook to said line and having a longitudinal aperture formed therein, said disk being slidably mounted upon said line, said knots being slidably releasable from said disk and capable of being drawn therethrough at will by reeling in said line, said aperture being so proportioned as to resist the free passage of said knots in either direction except when tension is placed upon said line by reeling motion and by abutment of the disk against said line guide, and said disk being formed intermediate its ends with an enlarged central aperture coaxial with the longitudinal aperture for the free unrestricted disposition of one of said knots.

4. The combination of a fishing line and a leader disk for use with a reel, and a fishing pole having a line guide, said line having a number of spaced knots permanently tied therein, of a unitary relatively flat leader disk for attachment of a fish hook to said line and having a longitudinal aperture formed therein, said disk being slidably mounted upon said line, said knots being slidably releasable from said disk and capable of being drawn therethrough at will by reeling in said line, said aperture being so proportioned as to resist the free passage of said knots except when tension is placed upon said line by reeling motion and by abutment of the disk against said line guide, said disk being formed intermediate its ends with an enlarged central aperture coaxial with the longitudinal aperture for the free unrestricted disposition of one of said knots, and a tapered centering aperture formed at each of the outer ends of the longitudinal aperture.

5. The combination of a fishing line and a leader disk for use with a reel, and a fishing pole having a line guide, said line having a number of spaced knots permanently tied therein, of a unitary relatively flat leader disk for attachment of a fish hook to said line and having a longitudinal aperture formed therein, said disk being slidably mounted upon said line, said knots being slidably releasable from said disk and capable of being drawn therethrough at will by reeling in said line, and said aperture being so proportioned as to resist the free passage of said knots except when tension is placed upon said line by reeling motion and by abutment of the disk against said line guide.

References Cited in the file of this patent

UNITED STATES PATENTS

| | | |
|---|---|---|
| 1,600,756 | Fairbanks | Sept. 21, 1926 |
| 1,670,185 | Bond | May 15, 1928 |
| 1,970,752 | Hughes | Aug. 21, 1934 |
| 1,974,499 | Luce | Sept. 25, 1934 |
| 2,293,294 | Heckman | Aug. 18, 1942 |
| 2,482,901 | Cianfrone | Sept. 27, 1949 |
| 2,662,328 | Oyler | Dec. 15, 1953 |
| 2,674,824 | Werner | Apr. 13, 1954 |

FOREIGN PATENTS

| | | |
|---|---|---|
| 169,109 | Great Britain | Sept. 22, 1921 |